United States Patent

[11] 3,625,318

| | | |
|---|---|---|
| [72] | Inventor | Hans Heinrich Wymann<br>Munchenbuchsee, Switzerland |
| [21] | Appl. No. | 874,228 |
| [22] | Filed | Nov. 5, 1969 |
| [45] | Patented | Dec. 7, 1971 |
| [73] | Assignee | Maschinenfabrik Winkler, Fallert & Co. AG<br>Bern, Switzerland |
| [32] | Priority | Nov. 8, 1968 |
| [33] | | Sweden |
| [31] | | 15206/68 |

[54] FRICTION BRAKE
17 Claims, 9 Drawing Figs.

[52] U.S. Cl. .................................................. 188/164, 192/84 A
[51] Int. Cl. .................................................. F16d 65/34
[50] Field of Search .................................................. 188/161, 164, 136, 137; 192/84 A; 310/93

[56] References Cited
UNITED STATES PATENTS

| | | | |
|---|---|---|---|
| 1,968,583 | 7/1934 | Apple | 188/164 |
| 3,232,385 | 2/1966 | Huber | 188/164 X |
| 3,455,419 | 7/1969 | Miquel | 188/164 |

Primary Examiner—Duane A. Reger
Attorney—McGlew and Toren

ABSTRACT: An electromagnetically operated friction brake includes a stator element, a rotor element and a magnetizing winding producing at least one magnetic field extending through both the stator element and the rotor element, the two elements defining at least one air gap therebetween. One of the elements is formed with a smooth sliding surface at an airgap, and a plurality of ferromagnetic friction bodies, such as balls, or cubes, are arranged in the airgap for movement along the sliding surface. The other element has ferromagnetic portions facing the airgap and formed with grooves or recesses cooperable with the friction bodies to provide for limited movement thereof in the grooves or recesses parallel to the sliding surface, and further providing for limited play of the friction bodies perpendicularly to the sliding surface. The sliding surface may comprise an annular surface of one of the two elements or may comprise the peripheral surface of a cylinder forming part of one of the two elements.

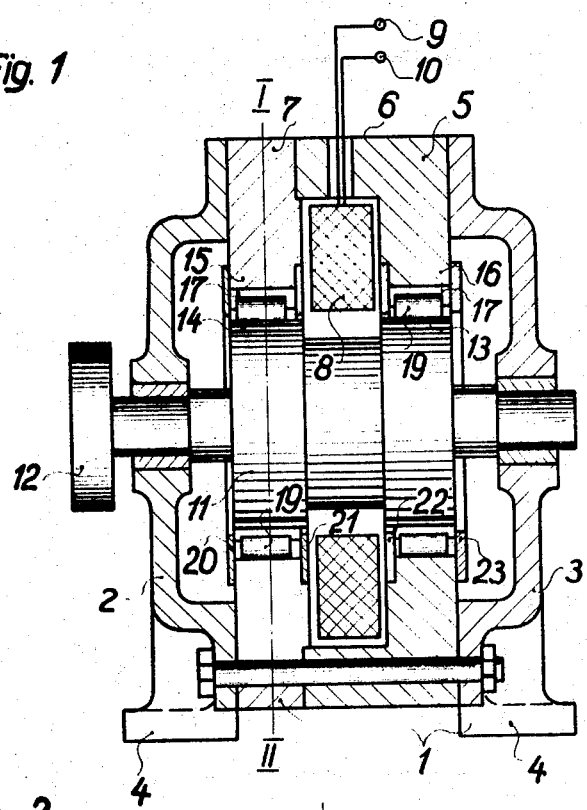
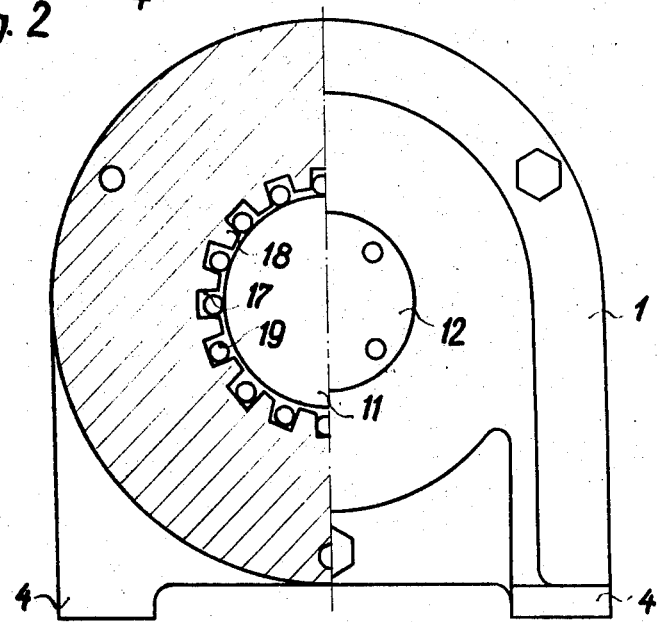

FRICTION BRAKE

BACKGROUND OF THE INVENTION

Over the last several years, electromagnetically operated brakes have been used to an increasing extent as control elements in control circuits or arrangements. In complicated control arrangements, the brakes used have to meet a number of different requirements. Thus, for example, the braking moment should be dependent only on the current of the brake-energizing winding, or perhaps also on the angular velocity, but definitely not on the degree of heating or on the degree of wear of the brake. Furthermore, the braking moment should be a steady function of the excitation of the energizing winding. Torque variations, as they appear, for example, as a result of brake drums which are out of line, should be avoided. In addition, such a brake must be rugged, resistant to climatic and mechanical influences, be independent of orientation, and be easy to maintain.

At present, there are principally three basic types of electric brakes in use, namely, electromagnetic dry disc brakes, eddy current brakes and magnetic powder brakes. All of these types can meet a part of the above-mentioned requirements, but each type has specific drawbacks which are annoying in certain applications. For example, in dry disc brakes, the braking moment is not a steady function of the excitation of the energizing winding, due to the return or restoring spring, and torque variations readily appear due to the distortion of the brake disc. The eddy current brake, which is highly suitable for many control problems and which is not subject to wear, cannot develop any braking moment at standstill. In cases involving this latter requirement, magnetic powder brakes have so far exhibited the best characteristics. However, magnetic powder brakes have two principal disadvantages. In the first place, known constructions cannot be used in any assembled orientation of the brake, and in the second place, maintenance is difficult due to the fact that the degree of wear is not easy to determine.

SUMMARY OF THE INVENTION

This invention relates to electromagnetically operated brakes and, more particularly, to a novel and improved electromagnetically operated friction brake which is free of the disadvantages of prior art electromagnetically operated brakes, simple in construction and easy to maintain.

The electromagnetically operated friction brake of the present invention preserves the advantages of a magnetic powder brake but has the additional advantage that it can be used in any assembled orientation and that maintenance the maintenance facilitated by the fact that wear can be readily recognized and wornout parts can be replaced simply. With respect to the several types of brakes mentioned above, the brake of the present invention most closely resembles, in its method of operation and construction, a magnetic powder brake, since the braking moment is produced by mechanical friction. However, in the invention brake, the production of the contact pressure and the function of the brake lining are combined in a single part, and finally, a plurality of independent friction bodies are used to produce the braking moment.

In accordance with the present invention, it has been found that friction bodies of substantially larger dimensions can be used in place of fine-grained powder, for obtaining the advantages of a magnetic powder brake, and this has the result that sealing problems and orientation dependence are eliminated.

In a magnetically operated friction brake embodying the invention, at least one magnetic field, produced by an energizing winding, extends through both a stator element and a rotor element. One of these elements has a smooth, slideway or sliding surface in at least one of the magnetic air gaps between the rotor element and the stator element. At least seven friction bodies of ferromagnetic material are so arranged in this airgap that they can slide on the slideway or sliding surface, and these bodies are retained, in the other element, in grooves or pockets provided in ferromagnetic material parts of the other element and which parts face the airgap. The friction bodies in these grooves or pockets can perform only minor movements parallel to the slideway or sliding surface while, at the same time, they have little play for movement in a direction perpendicular to the slideway or sliding surface.

A object of the invention is to provide an improved electromagnetically operated friction brake.

Another object of the invention is to provide such a brake which has all of the advantages of a magnetic powder type of electromagnetically operated brake while being free of the disadvantages of the latter.

A further object of the invention is to provide such a brake utilizing relatively large friction bodies to produce the braking moment.

Another object of the invention is to provide such a brake which can be used in any position or orientation and which is free of sealing problems.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is an axial or longitudinal section through one form of electromagnetically operated friction brake embodying the invention;

FIG. 2 is a part diametric-sectional view and part end elevation view, with the diametrical section being taken on the line I–II of FIG. 1;

DESCRIPTION OF THE PREFERRED EMBODIMENTS

Figure 3:
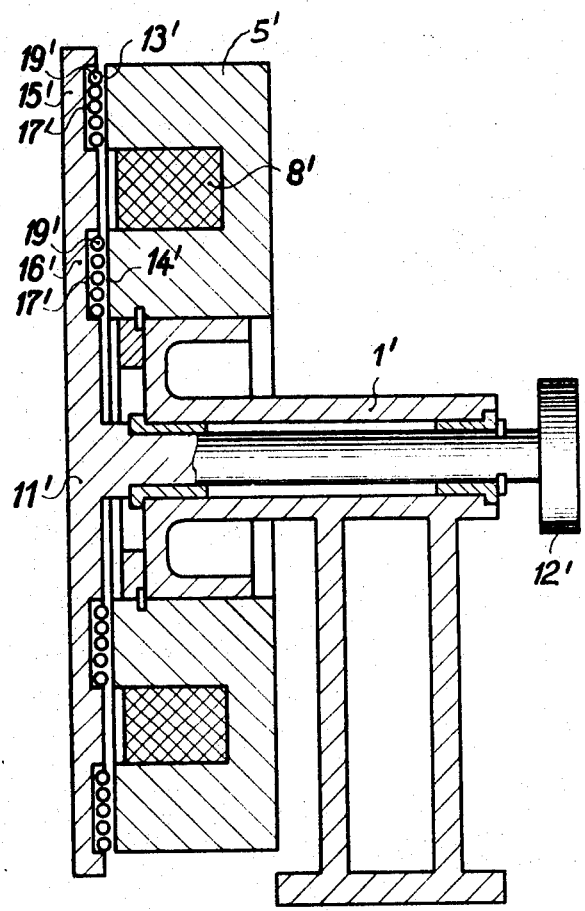
FIG. 3 is a longitudinal or axial sectional view of another electromagnetically operated friction brake embodying the invention.

Referring first to the embodiment of the invention shown in FIGS. 1 and 2, the fixed or stationary part of the brake, hereinafter called the stator or stator element 1, comprises four main parts. These main parts include bearing brackets 2 and 3, designed as legs 4, a magnetic yoke 5 comprising rings 6 and 7 of ferromagnetic material, and a magnetizing or energizing winding 8 having terminals 9 and 10. The ferromagnetic rotating part of the brake hereinafter called the rotor or rotor element 11, is supported in bearing brackets 2 and 3. For transmission of the braking moment, it has a flange 12. Additionally, it is formed with smooth circular cylindrical slideways or sliding surfaces 13 and 14.

In its parts 15 and 16 facing the airgap, magnet yoke 8 is formed with slots 17 uniformly distributed around the inner peripheries of the ferromagnetic rings 6 and 7, these slots 17 being separated by teeth 18 as best seen in FIG. 2. Each slot 17 has inserted thereinto a friction body 19 in the form of a cylindrical roller. Friction bodies 19 are restrained laterally in slots 17 by nonmagnetic retaining rings 20, 21, 22, and 23.

Slots 17 are sufficiently wide that friction bodies 19 have some lateral play, and are sufficiently deep that the friction bodies have a certain play relative to slide ways 13 and 14. If bodies 19 bear against the bases of slot 17, they preferably should protrude somewhat further toward slideways 13 and 14 than do the teeth 18.

Wen winding 8 is excited by a current flowing therethrough, a magnetic field is formed in the airgaps between parts 15 and 16, facing the airgap, and slideways 13 and 14. Friction bodies 19 thus are pulled toward teeth 18, on the one hand, and towards slideways 13 and 14 on the other hand. The normal pressures on the bearing points increase with increasing magnetic field, as do also the friction forces that can be produced.

Figure 4:
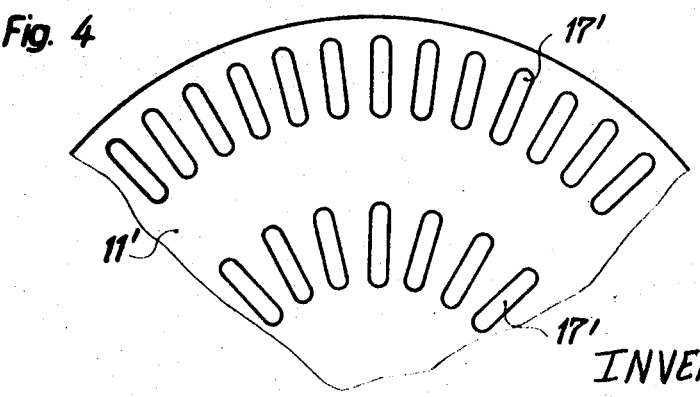
FIG. 4 is a partial elevation view of the rotor of the brake shown in FIG. 3, illustrating the arrangement of the grooves or recesses.

In the embodiment of the brake shown in FIGS. 3 and 4, rotor element 11' is disc-shaped. In the parts 15' and 16' of rotor 11' facing the airgap, there are formed slots 17' extending radially of rotor 11', and receiving the friction bodies 19' which, in this embodiment of the invention, are in the form of balls. The plane annular diametrically extending surfaces of magnet yokes 5' serve as the slideways or sliding surfaces 13' and 14'. Care must be taken that rotor 11' has practically no axial play with respect to stator 1'. The particular arrangement of slots 17' in rotor 11' is best seen in FIG. 4.

Figure 5:
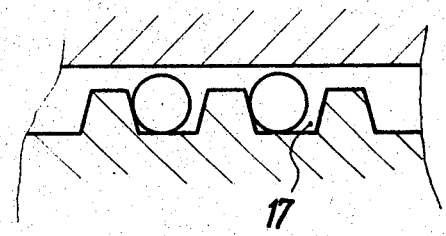
FIG. 5 is a partial sectional view through the friction surface and the grooved or slotted element.

FIG. 5 illustrates how the slots 17" also can be designed to be tapered or wedge-shaped, to increase the braking effect.

Figure 6:
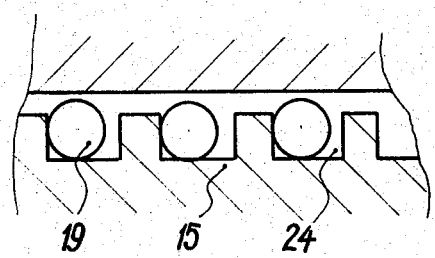
FIG. 6 is a partial sectional view through the friction surface and the other element formed with individual pockets or recesses.
Figure 7:
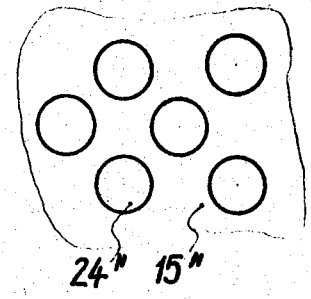
FIG. 7 is a partial elevation view of the pockets or recesses shown in FIG. 6.

FIG. 6 shows an arrangement of spherical friction bodies 19' in individual pockets 24 of one of the rotor or stator elements of the brake, with FIG. 7 illustrating the distribution of pockets 24 on the ferromagnetic parts 15" or 16" facing the airgap.

Figure 8:
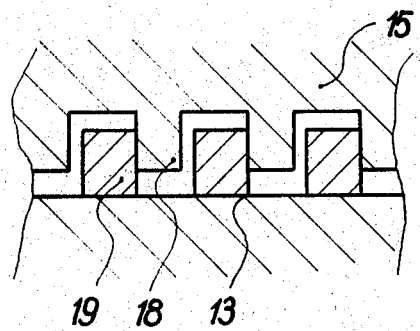
FIG. 8 is a sectional view through the friction surface and the slotted or grooved facing element, in an embodiment of the invention utilizing rectangular friction bodies.

FIG. 8 illustrates the use of prismatic bars of rectangular cross section as the friction bodies 19''. As, in this arrangement, and in contrast to the use of rollers or balls as the friction bodies, there is no curvature of the friction bodies facing the slideways to produce a concentration of the magnetic field, it is particularly important that the rectangular or square friction bodies 19' always project beyond teeth 18, insofar as these teeth consist of ferromagnetic material. On the other hand, it is desirable to support the friction bodies 19'' as close as possible to slideways 13. However, because of unavoidable manufacturing tolerances, it is sometimes difficult to meet both requirements at the same time.

Figure 9:
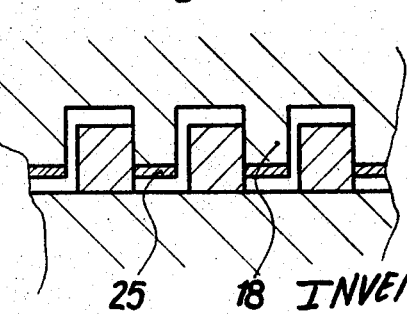
FIG. 9 is a view, similar to FIG. 8, illustrating an embodiment of the invention wherein the teeth between the slots or grooves comprise nonmagnetic material.

FIG. 9 illustrates how this problem can be solved even for relatively large manufacturing tolerances. In FIG. 9, teeth 18' are provided, at the extremities, with a nonmagnetic coat 25. This has the result that the magnetically effective depth of the teeth is smaller than the geometric depth.

While specific embodiments of the invention have been shown and described in detail to illustrate the application of the principles of the invention it will be understood that the invention may be embodied otherwise without departing from such principles.

What is claimed is:

1. An electromagnetically operated brake comprising, in combination, a stator element; a rotor element having an axis of rotation; a magnetizing winding producing at least one magnetic field extending through both said stator element and said rotor element, said elements defining at least one air gap therebetween; one of said elements being formed with a smooth sliding surface at at least one airgap; and a plurality of ferromagnetic friction bodies arranged in said one airgap for movement along said sliding surface; the other of said elements having ferromagnetic portions facing said one airgap and formed with retaining formations cooperable with said ferromagnetic friction bodies to provide for limited movement of said friction bodies between said formations parallel to said sliding surface and for limited play of said friction bodies perpendicularly against said sliding surface.

2. A electromagnetically operated brake, as claimed in claim 1, in which said magnetizing winding is a circular annular winding concentric with the axis of rotation of said rotor element.

3. A electromagnetically operated brake as claimed in claim 1, in which said sliding surface is an annular plane surface perpendicular to the axis of rotation of said rotor element.

4. An electromagnetically operated brake, as claimed in claim 1, in which said sliding surface is a circular plane surface which is perpendicular to the axis of rotation of said rotor element.

5. An electromagnetically operated brake, as claimed in claim 1, in which said sliding surface is the surface of a circular cylinder concentric with the axis of rotation of said rotor element.

6. An electromagnetically operated brake, as claimed in claim 2, in which said sliding surface is the surface of a circular cylinder concentric with the axis of rotation of said rotor element.

7. An electromagnetically operated brake, as claimed in claim 1, in which said ferromagnetic friction bodies are balls.

8. An electromagnetically operated brake, as claimed in claim 1, in which said ferromagnetic friction bodies are rollers.

9. An electromagnetically operated brake, as claimed in claim 1, in which said formations are grooves in said ferromagnetic portions of said other element.

10. An electromagnetically operated brake, as claimed in claim 9, in which said grooves increase in width in a direction toward said sliding surface, to increase the braking effect.

11. An electromagnetically operated brake, as claimed in claim 1, in which said formations in said ferromagnetic portions of said other body are pocket-shaped recesses.

12. An electromagnetically operated brake, as claimed in claim 9, in which said slots are separated by teeth formed as parts of said ferromagnetic portions of said other element; said ferromagnetic friction bodies comprising prismatic bars of rectangular cross section; the depth of said grooves being such that, when said ferromagnetic friction bodies are engaged with the bases of said grooves, they project beyond the ferromagnetic portions of said teeth toward said sliding surface.

13. An electromagnetically operated brake, as claimed in claim 9, in which said formations in said ferromagnetic portions of said other element are grooves separated by teeth forming part of said ferromagnetic portions; the extremities of said teeth facing said sliding surface having nonmagnetic coatings thereon.

14. An electromagnetically operated brake, as claimed in claim 1, in which said rotor element includes a circular disc having one circular surface formed with at least one circular row of radially extending grooves constituting said retaining formations.

15. An electromagnetically operated brake as in claim 1, wherein said bodies are located so that when said magnetizing winding produces the magnetic field the magnetic field the bodies are located in the magnetic field so as to be drawn against said sliding surface.

16. An electromagnetically operated brake as in claim 15, wherein said bodies are located so that when said magnetizing winding produces the magnetic field said bodies are also drawn toward individual ones of said formations.

17. A electromagnetically operated brake as in claim 1, wherein said elements form a circular gap and wherein said plurality of ferromagnetic friction bodies and said formations are arranged circumferentially in said gap, and wherein said bodies are arranged independent from each other between said retaining formations.

* * * * *